United States Patent [19]
Jones

[11] Patent Number: 6,140,609
[45] Date of Patent: Oct. 31, 2000

[54] HEATED AUTOMOTIVE RUNNING BOARD

[75] Inventor: Thaddeus M. Jones, Bremen, Ind.

[73] Assignee: MSX, Inc., South Bend, Ind.

[21] Appl. No.: 09/324,533

[22] Filed: Jun. 2, 1999

[51] Int. Cl.⁷ ........................................... B60L 1/02
[52] U.S. Cl. ........................................... 219/202; 219/213
[58] Field of Search ........................... 219/200, 201, 219/202, 212, 213, 203, 520, 534, 536, 538, 542, 544; 280/163, 169

[56] References Cited

U.S. PATENT DOCUMENTS

| | | | |
|---|---|---|---|
| 1,140,055 | 5/1915 | Mumma . | |
| 2,077,822 | 4/1937 | Baker | 250/33 |
| 2,189,155 | 2/1940 | Upson | 250/33 |
| 2,214,048 | 9/1940 | Edwards | 250/33 |
| 2,844,696 | 7/1958 | Custer, Jr. | 219/19 |
| 5,023,428 | 6/1991 | Hegstad | 219/213 |
| 5,286,049 | 2/1994 | Khan | 280/163 |
| 5,291,000 | 3/1994 | Hornberger | 219/539 |
| 5,573,686 | 11/1996 | Lavicska | 219/202 |
| 5,897,802 | 4/1999 | Jones | 219/202 |

*Primary Examiner*—Tu Ba Hoang
*Attorney, Agent, or Firm*—Taylor & Aust, P.C.

[57] ABSTRACT

A heated running board assembly for use with a motor vehicle. The heated running board assembly includes a running board and a heater assembly. The running board has a stepping surface and is attached to a motor vehicle. The heater assembly includes a resistive heating element which is embedded within the running board and heats the stepping surface thereof. The heated running board assembly includes a sensor assembly, a timer, and a controller, and is connected through a switch to the motor vehicle battery.

22 Claims, 2 Drawing Sheets

HEATED AUTOMOTIVE RUNNING BOARD

BACKGROUND OF THE INVENTION

1. Field of the Invention

The present invention relates to running boards for use with motor vehicles.

2. Description of the Related Art

Motor vehicles, especially motor vehicles of the sport utility, van, and pickup types, frequently have running boards attached thereto. Running boards are typically attached to motor vehicles below the vehicle door openings, and typically have a surface upon which a vehicle passenger steps. The running board, and therefore the stepping surface, is typically positioned somewhat lower than the bottom, or sill, of the vehicle door opening, thereby creating an intermediate step between the ground and the bottom of the vehicle door opening, or sill. This intermediate step lessens the height a vehicle driver or passenger must step in order to enter or exit the vehicle, thereby easing entry and exit.

During use, running boards and the stepping surfaces thereof are exposed to the outside environment. Consequently, the stepping surface of the running board may be exposed to snow, rain and ice, all of which may accumulate thereon resulting in reduced traction upon the stepping surface of the running board.

What is needed in the art is a running board which will resist the accumulation thereon of rain, snow or ice, and remove any rain, snow or ice which happens to accumulate thereon, thereby ensuring a stepping surface with good traction.

SUMMARY OF THE INVENTION

The present invention provides a heated running board assembly for use with a motor vehicle.

The invention comprises, in one form thereof, a heated running board assembly connected to a motor vehicle. The running board assembly includes a running board, a stepping surface, and a heater assembly having a resistive heating element configured for heating the stepping surface of the running board. The running board assembly includes a sensor assembly, a timer, and a controller, and is connected through the ignition switch of the motor vehicle to the motor vehicle battery.

An advantage of the present invention is that snow and ice does not accumulate on the stepping surface of the running board.

Another advantage is that the traction upon the stepping surface of the running board is not degraded due to the precipitation of snow or ice thereon.

Yet another advantage is that the precipitation or presence of snow or ice on the running board is detected and removed automatically, thus preventing accumulation thereof on the stepping surface of the running board.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
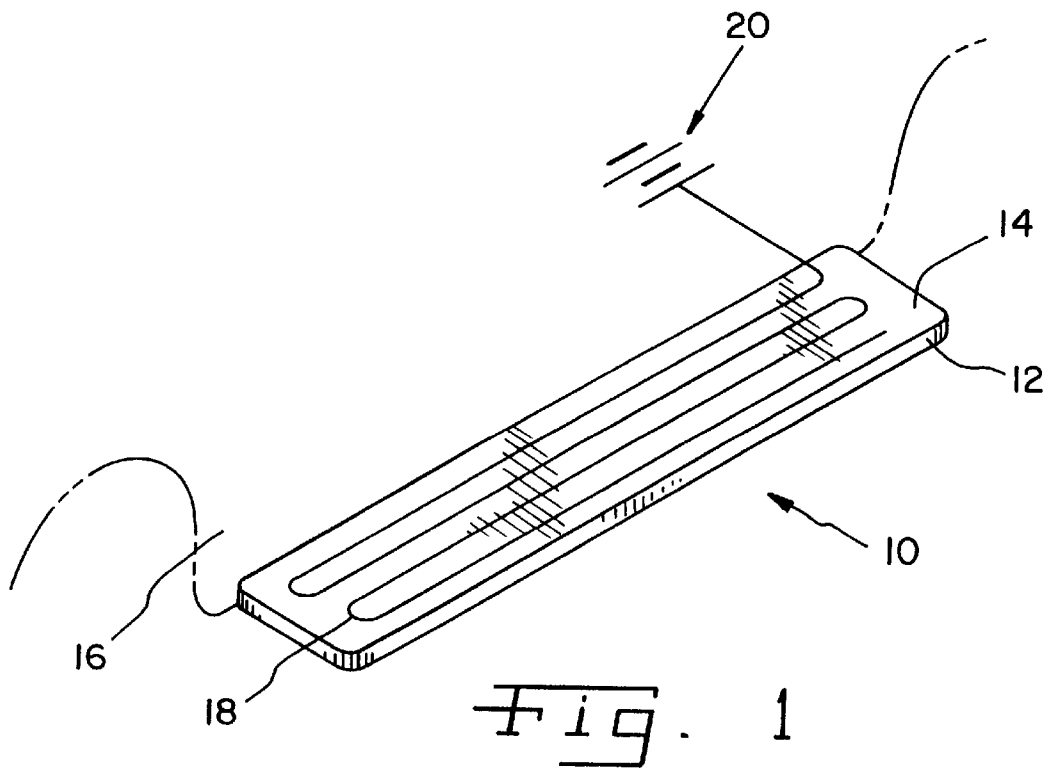
FIG. 1 is a partially-sectioned view of a running board assembly of the present invention.

Referring now to the drawings and particularly to FIG. 1, there is shown an embodiment of a heated running board assembly 10 of the present invention. Heated running board assembly 10 includes a running board 12 having a stepping surface 14, and heating element 18. Running board 12 is mechanically connected to motor vehicle 16 (shown in part in phantom).

Unless otherwise noted, details familiar to persons skilled in the electronic arts will be omitted since they are extraneous detail and thus have no bearing on reducing the invention to practice. Where in this application the terms "control", "controlling" or the like are used, it is to be understood that such terms may include the meaning of the terms "regulate", "regulating", etc. That is, such "control" may or may not include a feedback loop. Moreover, it is also to be understood, and it will be appreciated by those skilled in the art, that the methodology and logic of the present invention described herein may be carried out using any number of structural configurations such as electronic hardware, software, and/or firmware, or the like.

Heating element 18 is embedded within running board 12 and is electrically connected to and powered by motor vehicle battery 20. Heating element 18, which can be in the form of a resistive heating element or wire arranged in a serpentine pattern, heats stepping surface 14 of running board 12.

Figure 2:
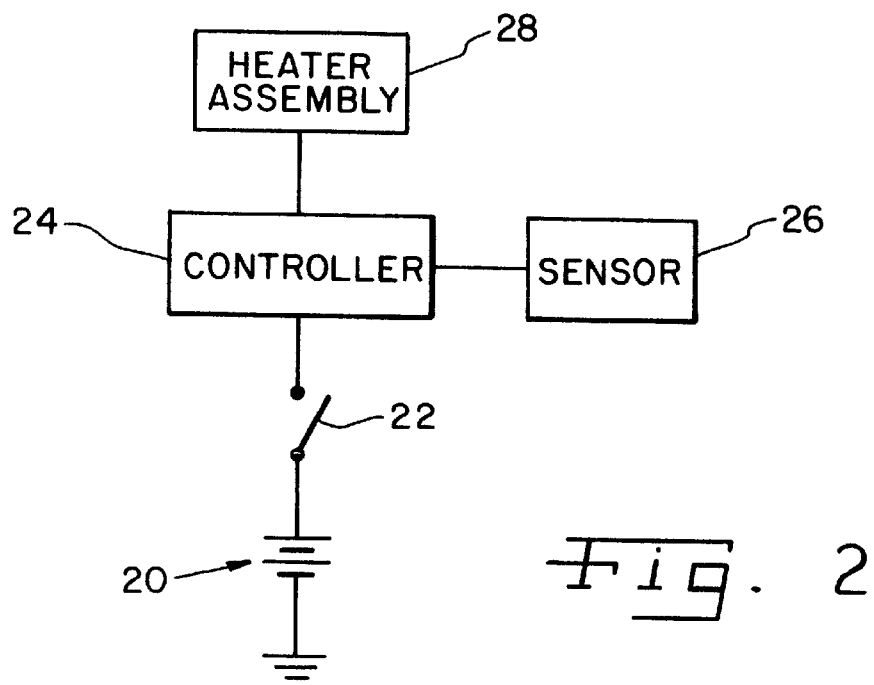
FIG. 2 is a block diagram of the running board assembly of FIG. 1.

Referring to FIG. 2, motor vehicle battery 20 is electrically connected through motor vehicle ignition switch 22 to automatic controller 24. Sensor assembly 26 senses ambient temperature and/or moisture, and provides a signal indicative thereof to controller 24. Controller 24 controls the operation of heating assembly 28, which includes at least one heating element 18.

Sensor assembly 26 includes at least one sensor to sense ambient temperature and/or moisture. Sensor assembly 26 also includes any circuitry necessary to provide at least one signal indicative of the ambient temperature and/or moisture which is appropriate for inputting to controller 24. An example of a sensor which may combine moisture sensing and ambient temperature sensing is known, e.g., from a model CIT-1 Snow Sensor which is manufactured by the Assignee of the present invention.

Controller 24 controls the operation of heating assembly 28 depending, in part, upon the signal of sensor assembly 26. More particularly, controller 24 monitors the signals from sensor assembly 26 and compares them against predetermined maximum or minimum levels, or thresholds. When the signal from sensor assembly 26 indicates to controller 24 that one or more of those predetermined maximum or minimum levels, or thresholds, has been exceeded, controller 24 activates heating assembly 28. However, before doing so, controller 24 also compares the voltage level of motor vehicle battery 20 to a predetermined level, thereby ensuring adequate power resides within motor vehicle battery 20 to drive heating assembly 28. Controller 24 also determines the state of motor vehicle ignition switch 22 (i.e., whether motor vehicle ignition switch 22 is on or off). If motor vehicle battery 20 has sufficient voltage, and if motor vehicle ignition switch 22 is activated, or "on", controller 24 will activate heating assembly 28.

In another embodiment, controller 24 activates heating assembly 28 when motor vehicle ignition switch 22 is in the "off" position. Before doing so, controller 24 determines whether motor vehicle battery 20 has sufficient voltage to drive heating assembly 28. In this embodiment, controller 24 deactivates heating assembly 28 after a predetermined period of operation when motor vehicle ignition switch 22 is in the "off" position, thereby ensuring motor vehicle battery 20 is not depleted by an extended period of operation of heating assembly 28.

Figure 3:
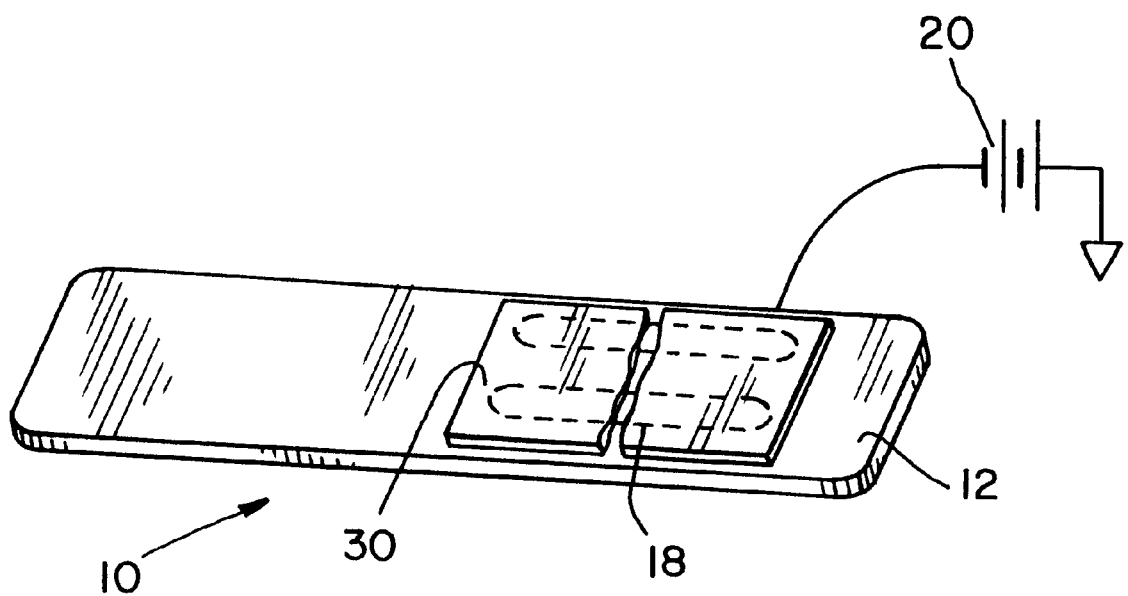
FIG. 3 is a partially-sectioned view of a second embodiment of a running board assembly of the present invention.

Referring to FIG. 3, a second embodiment of running board assembly 10 includes running board 12, heating element 18 and mat 30. Heating element 18 is embedded within mat 30, and is connected to motor vehicle battery 20. Mat 30 is constructed of a material, for example rubber, that is electrically insulative but thermally conductive. Mat 30 is attached to running board 12.

In use, automatic controller 24 automatically activates heating assembly 28 when the signals from sensor assembly 26 indicate an ambient temperature of 36° F. or less and/or the presence of moisture on or around running board 12. Once heating assembly 28 is activated, electrical current flows through resistive heating element 18 which is embedded within running board 12 underneath stepping surface 14 thereof. Resistive element 18 emits heat as a result of the electrical current flow, and thereby heats stepping surface 14. Any snow or ice that has previously accumulated on running board 12 melts, while any snow or ice that is falling upon or impacting running board 12 does not accumulate on stepping surface 14, which is being heated by heating element 18.

Automatic controller 24, in the embodiment shown, is constructed as an integral unit which includes a number of separate subsystems or modules. However, it is to be understood that automatic controller 24 can be configured as a dedicated, stand-alone controller, or the function of automatic controller 24 can be incorporated into an existing microcomputer or controller on the motor vehicle to which running board assembly 10 is attached.

In the embodiment shown, heating assembly 28 is configured with a single resistive heating element 18 which is embedded within running board 12. However, it is to be understood that heating assembly 28 could be alternatively configured to achieve the same purpose. For example, heating assembly 28 could be configured to include several resistive heating elements to heat the stepping surface or surfaces of one running board, or could be configured to contain several resistive heating elements to heat the stepping surfaces of several running boards.

Moreover, in the embodiment shown, heating element 18 is embedded within running board 12. However, it is to be understood that heating element 18 could be alternatively configured to achieve the same purpose. For example, rather than being embedded within running board 12, heating element 18 could be alternatively configured to be placed on or adhered to stepping surface 14 of running board 12.

Heating assembly 28 is, in the embodiment shown, configured with a resistive heating element 18. Heating assembly 28 can include, in addition to resistive heating element 18, ground fault interruption circuitry or protection and/or an independent fusing arrangement. Furthermore, it is to be understood that heating assembly 28 could be alternatively configured to achieve the same purpose. For example, heating assembly 28 could be configured to include a plurality of tubes which circulate a hot fluid, such as radiator fluid, or hot air, such as exhaust, through running board 12, thereby heating stepping surface 14.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A running board assembly for use with a motor vehicle, the motor vehicle having a battery, said running board assembly comprising:

a running board having a stepping surface, said running board configured for being attached to the motor vehicle; and a heater assembly associated with said running board, said heater assembly configured for heating at least a portion of said stepping surface, said heater assembly configured for being powered by the battery of the motor vehicle.

2. The running board assembly of claim 1, wherein said heater assembly includes at least one resistive heating element.

3. The running board assembly of claim 2, wherein said at least one resistive heating element is embedded within said running board.

4. The running board assembly of claim 2, wherein said at least one resistive heating element is attached to said running board.

5. The running board assembly of claim 4, further comprising a layer of electrically insulating and thermally conductive material attached to said running board, said layer of electrically insulating and thermally conductive material substantially covering said at least one resistive heating element.

6. The running board assembly of claim 2, further comprising a layer of electrically insulating and thermally conductive material, wherein said layer of electrically insulating and thermally conductive material is attached to said running board, said at least one resistive heating element being embedded within said layer of electrically insulating and thermally conductive material.

7. The running board assembly of claim 1, wherein said heater assembly is configured for being powered by the battery of the motor vehicle.

8. The running board assembly of claim 1, further including at least one switch having an "on" state and an "off" state, wherein said at least one switch selectively activates and deactivates said heater assembly.

9. The running board assembly of claim 8, further comprising an automatic controller configured for at least one of automatically activating and deactivating said heater assembly.

10. The running board assembly of claim 9, further comprising at least one sensor electrically connected to said automatic controller, said at least one sensor being configured for sensing at least one of ambient temperature and moisture, and for providing at least one sensor signal to thereby indicate said at least one of ambient temperature and moisture, said automatic controller receiving said at least one sensor signal and selectively controlling operation of said heater assembly dependent upon said at least one sensor signal.

11. The running board assembly of claim 1, wherein said heater assembly is configured for at least one of melting accumulated snow from at least a portion of said stepping surface of said running board, preventing the accumulation of snow upon at least a portion of said stepping surface of said running board, and evaporating moisture from at least a portion of said stepping surface of said running board.

12. A method of removing accumulated snow and ice from a running board of a motor vehicle, said method comprising the steps of:

provideing a heating assembly, said heating assembly including at least one heating element;

associating said heating element with the running board;

connecting said at least one heating element of said heating assembly to a power source, said power source being a battery of the motor vehicle; and heating the running board by activating said at least one heating element.

13. The method of claim 12, wherein said associating step includes embedding said at least one heating element within the running board.

14. The method of claim 12, wherein said associating step includes attaching said at least one heating element to said running board.

15. A motor vehicle, comprising:

a body;

a battery carried by said body;

an ignition switch carried by said body; and a running board attached to said body, said running board having a heating assembly including at least one heating element configured for heating at least a portion of said running board and configured for being powered by said battery.

16. The motor vehicle of claim 15, wherein said at least one heating element comprises at least one resistive heating element electrically connected to said battery, said at least one resistive heating element being one of embedded within and attached to said running board.

17. The motor vehicle of claim 15, wherein said at least one heating element is connected to said battery through said ignition switch such that actuating said ignition switch selectively activates and deactivates said at least one heating element.

18. The motor vehicle of claim 16, further comprising:

at least one sensor configured for sensing at least one of ambient temperature and moisture, and for providing at least one sensor signal to thereby indicate said at least one of ambient temperature and moisture; and an automatic controller receiving said at least one sensor signal, and being configured to automatically activate and deactivate said heater assembly dependent upon said at least one sensor signal.

19. A motor vehicle comprising:

a step assembly;

a power source carried by said motor vehicle;

a heater assembly carried by and attached to said step assembly, said heater assembly including at least one resistive heating element; and said power source connected to said at least one resistive heating element.

20. The motor vehicle of claim 19, wherein said step assembly comprises a running board.

21. The motor vehicle of claim 19, wherein said heater assembly is comprised of a mat with said at least one resistive heating element embedded therein.

22. The motor vehicle of claim 19, wherein said power source is a battery of the motor vehicle.

\* \* \* \* \*

UNITED STATES PATENT AND TRADEMARK OFFICE
CERTIFICATE OF CORRECTION

PATENT NO.    : 6,140,609
DATED         : October 31, 2000
INVENTOR(S)   : Thaddeus M. Jones It is certified that error appears in the above-identified patent and that said Letters Patent is hereby corrected as shown below:

<u>Column 6,</u>
Line 11, delete "16" and substitute -- 15 -- therefor.

Signed and Sealed this

Twenty-fifth Day of September, 2001

Attest:

*Nicholas P. Godici*

NICHOLAS P. GODICI
*Attesting Officer*     *Acting Director of the United States Patent and Trademark Office*